US012561448B1

(12) United States Patent
Kabir et al.

(10) Patent No.: US 12,561,448 B1
(45) Date of Patent: Feb. 24, 2026

(54) SYSTEMS AND METHODS FOR SIMULATING APPLICATION BREACHES

(71) Applicant: Fannie Mae, Washington, DC (US)

(72) Inventors: Md Kabir, Washington, DC (US); Sundaram Majumdar, Washington, DC (US)

(73) Assignee: Fannie Mae

( * ) Notice: Subject to any disclaimer, the term of this patent is extended or adjusted under 35 U.S.C. 154(b) by 7 days.

(21) Appl. No.: 18/807,000

(22) Filed: Aug. 16, 2024

(51) Int. Cl.
G06F 21/57 (2013.01)
G06F 21/31 (2013.01)
G06F 21/55 (2013.01)

(52) U.S. Cl.
CPC ............ G06F 21/577 (2013.01); G06F 21/31 (2013.01); G06F 21/552 (2013.01)

(58) Field of Classification Search
CPC ....... G06F 21/577; G06F 21/31; G06F 21/552
See application file for complete search history.

(56) References Cited

U.S. PATENT DOCUMENTS

| 7,603,713 B1 * | 10/2009 | Belov | ................. | G06F 11/3652 |
| | | | | 703/23 |
| 9,027,135 B1 * | 5/2015 | Aziz | ..................... | G06F 21/554 |
| | | | | 726/23 |
| 9,906,538 B2 * | 2/2018 | Zeitlin | ................ | H04L 63/1416 |
| 2020/0021496 A1 * | 1/2020 | Balabine | .............. | H04L 41/145 |
| 2024/0220635 A1 * | 7/2024 | Finke | ..................... | G06F 21/577 |
| 2024/0303344 A1 * | 9/2024 | Chiscariu | ................ | G06F 21/53 |
| 2024/0411869 A1 * | 12/2024 | Patel | .................. | G06Q 30/0185 |
| 2025/0252024 A1 * | 8/2025 | Margalit | .............. | G06F 11/008 |

* cited by examiner

*Primary Examiner* — Beemnet W Dada
(74) *Attorney, Agent, or Firm* — Foley & Lardner LLP

(57) ABSTRACT

Disclosed are systems and methods for dynamic application testing. One or more processing circuits receive an application package with an application and authentication information corresponding with group permission states. The one or more processing circuits authenticate access based on the authentication information and group permission states, model testing parameters, and generate indications, with at least one indication corresponding to a simulated breach. The one or more processing circuits retrieve testing parameters via an API, simulate the breach by providing breach data to update a testing parameters state from a first to a second state, and generate an indication for the update. The one or more processing circuits generate and provide a token with authentication information and the indication to a monitoring system, receive an alert identifier from the monitoring system, and generate a data package including the testing parameter, alert identifier, and indication.

20 Claims, 5 Drawing Sheets

200

VALIDATION STATUS DETAILS

| RESOURCE | ALARM NAME | LATEST ALARM STATE | BREACHING DATAPOINTS | ALERT CREATED IN SENTINUS? | SENTINUS ALERT IDS |
|---|---|---|---|---|---|
| RESOURCE #1 | FM-ECS-GPL-DEV1-CW-ALARMS_GPL-ECS-WARNING_GPL-ECS-GPLECSL_GPL-CND-SVC-01-CPUUTILIZATION-WARNING | ALARM UPDATED FROM OK TO ALARM | [{'TIMESTAMP':'2024-06-17T16:54:00.000+0000','SAMPLECOUNT':45.0,'VALUE':142.41345067527234}, {'TIMESTAMP':'2024-06-17T16:49:00.000+0000','SAMPLECOUNT':45.0,'VALUE':142.40028270234113}] | NO | N/A |
| RESOURCE #1 | FM-ECS-GPL-DEV1-CW-ALARMS_GPL-ECS-WARNING_GPL-ECS-GPLECSL_GPL-CND-SVC-01-MEMORYUTILIZATION-WARNING | ALARM UPDATED FROM OK TO ALARM | [{'TIMESTAMP':'2024-06-17T16:54:00.000+0000','SAMPLECOUNT':45.0,'VALUE':147.60731229745372}, {'TIMESTAMP':'2024-06-17T16:49:00.000+0000','SAMPLECOUNT':45.0,'VALUE':147.60814525462362}] | NO | N/A |
| RESOURCE #1 | FM-ECS-GPL-DEV1-CW-ALARMS_GPL-ECS_GPLECSL_GPL-CND-SVC-01-CPUUTILIZATION-CRITICAL | ALARM UPDATED FROM OK TO ALARM | [{'TIMESTAMP':'2024-06-17T16:54:00.000+0000','SAMPLECOUNT':44.0,'VALUE':145.61185121799}, {'TIMESTAMP':'2024-06-17T16:49:00.000+0000','SAMPLECOUNT':45.0,'VALUE':142.40028270234113}] | YES | 595852 |
| RESOURCE #2 | FM-ECS-GPL-DEV1-CW-ALARMS_GPL-ECS_GPLECSL_GPL-CND-SVC-01-MEMORYUTILIZATION-CRITICAL | ALARM UPDATED FROM OK TO ALARM | [{'TIMESTAMP':'2024-06-17T16:54:00.000+0000','SAMPLECOUNT':45.0,'VALUE':149.98082134824912}, {'TIMESTAMP':'2024-06-17T16:49:00.000+0000','SAMPLECOUNT':45.0,'VALUE':147.60814525462362}] | YES | 595815 |
| RESOURCE #3 | FM-ECS-GPL-DEV1-CW-ALARMS_GPL-ECS-GPL-ECS-GPLECSL_GPL-CND-SVC-01-TASKCAPACITY-CRITICAL | ALARM UPDATED FROM OK TO ALARM | [{'TIMESTAMP':'2024-06-17T16:54:00.000+0000','VALUE':0.0}, {'TIMESTAMP':'2024-06-17T16:49:00.000+0000','VALUE':0.0}] | YES | 595855 |
| RESOURCE #4 | FM-ELASTICLOADBALANCINGV2-GPL-DEV1-CW-ALARMS_APP-GPL-ALB-ECS-GPLECS1.815AA95C52F846FB-GPL_CLIENTTLSNEGOTIATIONERRORCOUNT-CRITICAL | ALARM UPDATED FROM OK TO ALARM | [{'TIMESTAMP':'2024-06-17T16:54:00.000+0000','SAMPLECOUNT':1.0,'VALUE':15.0}, {'TIMESTAMP':'2024-06-17T16:49:00.000+0000','SAMPLECOUNT':1.0,'VALUE':15.0}] | YES | 595892 |
| RESOURCE #4 | FM-ELASTICLOADBALANCINGV2-GPL-DEV1-CW-ALARMS_GPL-ELB_APP_GPL-ALB-ECS-GPLECS1.815AA95C52F846FB_TARGETGROUP_GPL-GPL-ECS-GPLECS1.4378DDC8DE5FED70-HTTPCODE_TARGET_4XX_COUNT-CRITICAL | ALARM UPDATED FROM OK TO ALARM | [{'TIMESTAMP':'2024-06-17T16:56:00.000+0000','SAMPLECOUNT':80.0}, {'TIMESTAMP':'2024-06-17T16:55:00.000+0000','SAMPLECOUNT':4.0,'VALUE':80.0}] | YES | 595810 |

FIG. 4

SYSTEMS AND METHODS FOR SIMULATING APPLICATION BREACHES

BACKGROUND

In software application development, entities such as developers or companies can develop and test applications to determine application functionality or compliance with various application criteria. These entities can desire to improve the speed, efficiency, or accuracy of application testing.

SUMMARY

Some embodiments relate to a method for providing and validating alerts. In some embodiments, the method can include one or more processing circuits receiving an application package including an application and authentication information of a user. In some embodiments, the authentication information corresponds with one or more group permission states. In some embodiments, the method can include authenticating, by the one or more processing circuits, access to the application based on the authentication information of the user and the one or more group permission states. In some embodiments, the method can include modeling, by the one or more processing circuits, one or more testing parameters to generate one or more indications. In some embodiments, at least one indication of the one or more indications corresponds with at least one simulated breach. In some embodiments, modeling can further include retrieving, by the one or more processing circuits, using an application programming interface (API) to call an API, the testing parameters of the application. In some embodiments, modeling can further include simulating, by the one or more processing circuits, the at least one simulated breach by providing breach data to cause a state of at least one testing parameter of the of testing parameters to be updated from a first state to a second state. In some embodiments, modeling can further include generating, by the one or more processing circuits, at least one indication corresponding to the update from the first state to the second state. In some embodiments, the method can include generating and providing, by the one or more processing circuits, a token including the authentication information of the user and the indication to a monitoring system. In some embodiments, the method can include receiving, by the one or more processing circuits, an alert identifier corresponding with the at least one indication. In some embodiments, the method can include generating, by the one or more processing circuits, a data package including the at least one testing parameter, the alert identifier, and the at least one indication.

In some embodiments, simulating the at least one simulated breach further includes identifying, by the one or more processing circuits, at least one threshold value corresponding to the at least one testing parameter and generating, by the one or more processing circuits, the breach data including of data objects. In some embodiments, at least one of the data objects is generated based on the threshold value that causes the state of the at least one testing parameter to be updated from the first state to the second state.

In some embodiments, providing breach data to the application further includes initializing, by the one or more processing circuits, an application testing framework of the application based on the testing parameters. In some embodiments, the application testing framework includes a controlled virtual environment to isolate application outputs corresponding to the at least one breach. In some embodiments, providing breach data to the application further includes injecting, by the one or more processing circuits, the data objects into the application based on providing at least one data object of the data objects as input to an application testing framework of the application. In some embodiments, injecting causes an invocation of at least one function of the application corresponding with the at least one testing parameter. In some embodiments, providing breach data to the application further includes determining, by the one or more processing circuits, the at least one indication includes a failure of the at least one testing parameter.

In some embodiments, the authentication information includes a user identifier of the user and a password, and the method further includes transmitting, by the one or more processing circuits, a request including a user identifier of the user and the password responsive to the user interacting with a user device.

In some embodiments, authenticating further includes, in response to receiving at least one successful response from the request, storing, by the one or more processing circuits, the user identifier and the password corresponding with the one or more group permission states. In some embodiments, authenticating further includes transmitting, by the one or more processing circuits, a request for application data of the application.

In some embodiments, the application data includes a position identifier, an application code of the application, an asset identifier of an asset of the application, and a storage location of the user or an access location of the user. In some embodiments, method further includes transmitting, by the one or more processing circuits, the data package including a report of the at least one testing parameter and the at least one indication to the user based on the storage location or the access location.

In some embodiments, the first state is a deactivated state corresponding with the at least one testing parameter passing, the second state is an activated state corresponding with the at least one testing parameter failing, and the at least one indication corresponds with the first state based on detecting an output of the application passing the at least one testing parameter, or corresponds with the second state based on detecting the output of the application failing the at least one testing parameter.

In some embodiments, the method further includes generating, by the one or more processing circuits, one or more content items or actionable elements corresponding to the data package. In some embodiments, at least one first element of the one or more content items or actionable elements includes the at least one indication. In some embodiments, at least one second element of the one or more content items or actionable elements includes the alert identifier. In some embodiments, the method further includes providing, by the one or more processing circuits, the one or more content items or actionable elements to a graphical user interface (GUI) in a viewport.

In some embodiments, the at least one testing parameter includes one or more testing configurations to determine one or more performance metrics of the application, and the method further includes modeling, by the one or more processing circuits, at least one performance metric of the one or more performance metrics based on the at least one simulated breach to generate metric data indicating a performance of the application. In some embodiments, the method further includes embedding, by the one or more processing circuits, the metric data into the data package.

Some embodiments relate to a system for providing and validating alerts. In some embodiments, the system includes one or more processing circuits configured to receive an application package including an application and authentication information of a user. In some embodiments, the authentication information corresponds with one or more group permission states. In some embodiments, the one or more processing circuits are further configured to authenticate access to the application based on the authentication information of the user and the one or more group permission states. In some embodiments, the one or more processing circuits are further configured to model a testing parameters to generate one or more indications. In some embodiments, at least one indication of the one or more indications corresponds with at least one simulated breach in the application. In some embodiments, the one or more processing circuits further configured to retrieve, using at least one application programming interface (API) call to an API, the testing parameters of the application. In some embodiments, the one or more processing circuits are further configured to simulate the at least one simulated breach by providing breach data to the application to cause a state of at least one testing parameter of the testing parameters to be updated from a first state to a second state. In some embodiments, the one or more processing circuits are further configured to generate the at least one indication corresponding to the update from the first state to the second state. In some embodiments, the one or more processing circuits are further configured to generate and provide a token including the authentication information of the user and the indication to a monitoring system. In some embodiments, the token includes a verification of the authentication information to provide the access to the application. In some embodiments, the one or more processing circuits are further configured to receive, from the monitoring system, an alert identifier corresponding with the at least one indication. In some embodiments, the one or more processing circuits are further configured to generate a data package including the at least one testing parameter, the alert identifier, and the at least one indication.

In some embodiments, the one or more processing circuits are further configured to, in simulating the at least one simulated breach, identify at least one threshold value corresponding to the at least one testing parameter and generate the breach data including a data objects. In some embodiments, at least one of the data objects is generated based on the threshold value that causes the state of the at least one testing parameter to be updated from the first state to the second state.

In some embodiments, the one or more processing circuits are further configured to in providing breach data to the application initialize an application testing framework of the application based on the testing parameters. In some embodiments, the application testing framework includes a controlled virtual environment to isolate application outputs corresponding to the at least one breach. In some embodiments, the one or more processors are further configured to inject the data objects into the application based on providing at least one data object of the data objects as input to an application testing framework of the application. In some embodiments, injecting causes an invocation of at least one function of the application corresponding with the at least one testing parameter. In some embodiments, the one or more processing circuits are further configured to determine the at least one indication includes a failure of the at least one testing parameter.

In some embodiments, the authentication information includes a user identifier of the user and a password. In some embodiments, the one or more processing circuits are further configured to transmit a request including a user identifier of the user and the password responsive to the user interacting with a user device.

In some embodiments, the one or more processing circuits are further configured to, in authenticating, in response to receiving at least one successful response from the request, store the user identifier and the password corresponding with the one or more group permission states. In some embodiments, the one or more processing circuits are further configured to transmit a request for application data of the application.

In some embodiments, the application data includes a position identifier, an application code of the application, an asset identifier of an asset of the application, and a storage location of the user or an access location of the user. In some embodiments, the one or more processing circuits are further configured to transmit the data package including a report of the at least one testing parameter and the at least one indication to the user based on the storage location or the access location.

In some embodiments, the first state is a deactivated state corresponding with the at least one testing parameter passing, the second state is an activated state corresponding with the at least one testing parameter failing, and the at least one indication corresponds with the first state based on detecting an output of the application passing the at least one testing parameter, or corresponds with the second state based on detecting the output of the application failing the at least one testing parameter.

In some embodiments, the one or more processing circuits are further configured to generate one or more content items or actionable elements corresponding to the data package. In some embodiments, at least one first element of the one or more content items or actionable elements includes the at least one indication, and at least one second element of the one or more content items or actionable elements includes the alert identifier. In some embodiments, the one or more processing circuits are further configured to providing the one or more content items or actionable elements to a graphical user interface (GUI) in a viewport.

In some embodiments, the at least one testing parameter includes one or more testing configurations to determine one or more performance metrics of the application. In some embodiments, the one or more processing circuits are further configured to model at least one performance metric of the one or more performance metrics based on the at least one simulated breach to generate metric data indicating a performance of the application. In some embodiments, the one or more processing circuits are further configured to embed the metric data into the data package.

Some embodiments relate to more non-transitory computer-readable media (CRM) having instructions stored thereon that, when executed by one or more processing circuits, cause the one or more processing circuits to receive an application package including an application and authentication information of a user. In some embodiments, the authentication information corresponds with one or more group permission states. In some embodiments, the instructions cause the one or more processing circuits to authenticate access to the application based on the authentication information of the user and the one or more group permission states. In some embodiments, the instructions cause the one or more processing circuits to model a testing parameters to generate one or more indications. In some embodiments, at least one indication of the one or more indications corresponds with at least one simulated breach in the application. In some embodiments, the instructions cause the one or more processing circuits to retrieve, using at least one application programming interface (API) call to an API, the testing parameters of the application. In some embodiments, the instructions cause the one or more processing circuits to simulate the at least one simulated breach by providing breach data to the application to cause a state of at least one testing parameter of the testing parameters to be updated from a first state to a second state. In some embodiments, the instructions cause the one or more processing circuits to generate the at least one indication corresponding to the update from the first state to the second state. In some embodiments, the instructions cause the one or more processing circuits to generate and provide a token including the authentication information of the user and the indication to a monitoring system. In some embodiments, the token includes a verification of the authentication information to provide the access to the application. In some embodiments, the instructions cause the one or more processing circuits to receive, from the monitoring system, an alert identifier corresponding with the at least one indication. In some embodiments, the instructions cause the one or more processing circuits to generate a data package including the at least one testing parameter, the alert identifier, and the at least one indication.

In some embodiments, the instructions cause the one or more processing circuits to, in simulating the at least one simulated breach, identify at least one threshold value corresponding to the at least one testing parameter. In some embodiments, the instructions cause the one or more processing circuits to, in simulating the at least one simulated breach, generate the breach data including a data objects, wherein at least one of the data objects is generated based on the threshold value that causes the state of the at least one testing parameter to be updated from the first state to the second state.

BRIEF DESCRIPTION OF THE DRAWINGS

FIG. 4 is an example graphical user interface depicting an application testing report, according to some arrangements.

Figure 1:
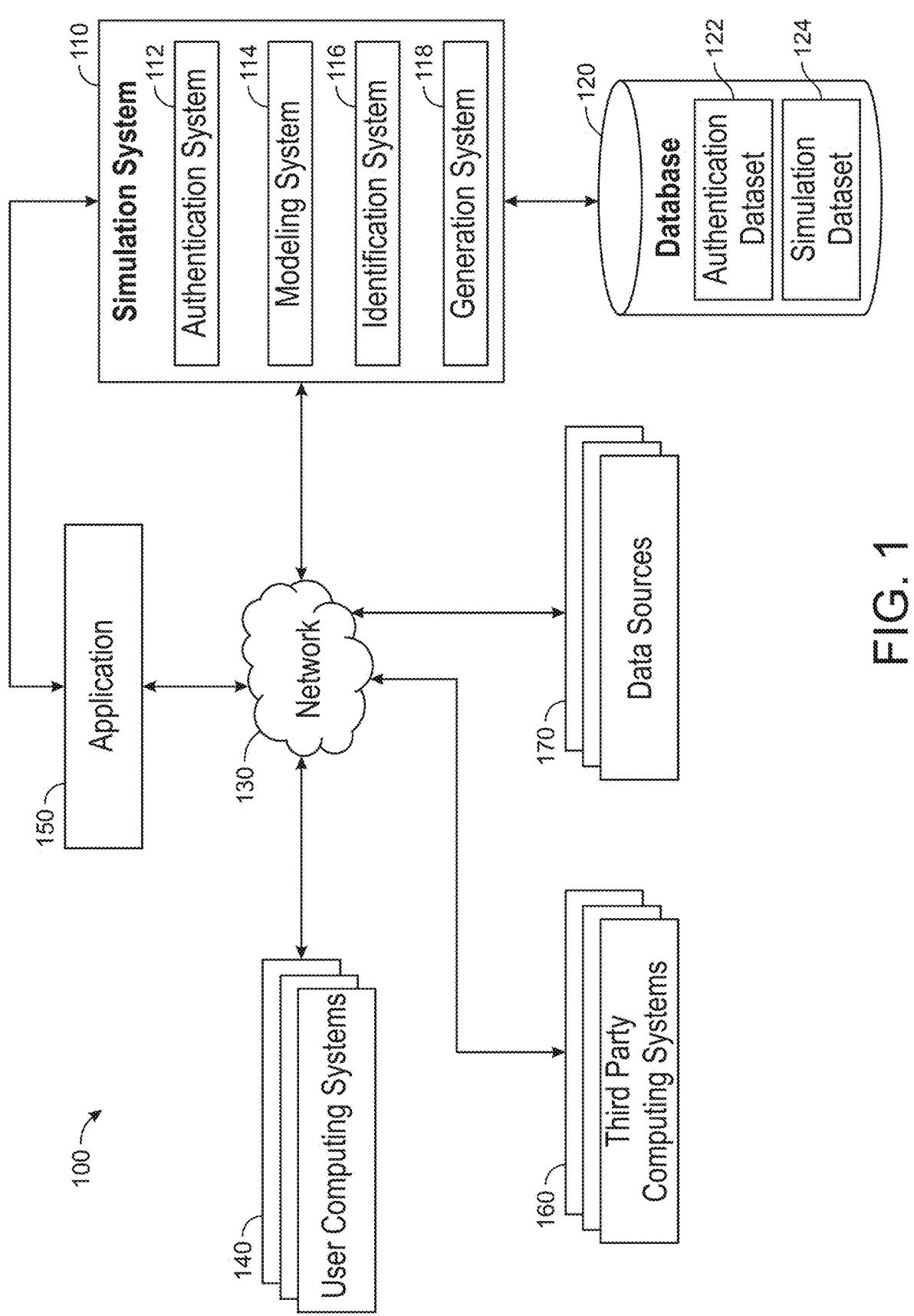
FIG. 1 is a block diagram depicting an implementation of a system for dynamic application testing, according to some embodiments.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the Figures, the systems, apparatuses, and methods described herein relate to dynamic application testing for software applications. In software application development, entities such as developers or companies can develop applications (e.g., programs, application tools, software services, application suits, digital solutions, software products, etc.) and test applications to determine if the application meets various criteria while maintaining continuous operation (e.g., without interrupting the functioning of the application). Entities can establish various criteria (e.g., standards, frameworks, architecture requirements, etc.) for testing an application and further perform manual reviews or tests to verify an application complies with various developer, architecture, or third-party requirements (e.g., encryption requirements, regulatory standards, entity requirements, etc.) or functions properly (e.g., without error). While manual tests can be performed to simulate conditions causing application failure or error (e.g., breaches), these manual tests can be time-intensive and cause computational inefficiencies. Manual testing is susceptible to human error and other errors, such as missing edge cases or failing to replicate and/or simulate real-world scenarios accurately. This lack of coverage can result in various application bugs or issues being missed or overlooked, which can cause security vulnerabilities, performance bottlenecks, synchronizing issues, and compatibility problems. These limitations can lead to incomplete assessments of the application's performance and compliance, resulting in potential vulnerabilities and undetected inefficiencies in the application.

To address these technical problems, the technical solutions implemented herein include a dynamic application testing system (or simulation system) to analyze and model an application, generate simulation data to simulate an application error (e.g., breach), and provide notifications and/or alerts to other computing systems and users based on corresponding results of various simulated test cases. The simulation system can include an authentication system, a modeling system, an identification system, and a generation system to perform tests, trigger application alerts or alarms based on application testing outputs (e.g., provide indications of passed or failed tests), and provide a report corresponding with the alerts or alarms.

Additionally, the systems and methods herein enhance application testing by dynamically simulating a real-world conditions to verify compliance of a software application with various testing parameters or application criteria (e.g., requirements, architecture parameters, etc.). By monitoring and testing applications under diverse scenarios using generated breach data, the systems disclosed herein can detect previously unrecognized issues such as rare security vulnerabilities, performance bottlenecks, and compatibility problems that would often be missed using manual testing or other testing frameworks. This approach of performing automatic tests with input data to cause application errors improves the effectiveness of compliance assessments, reduces the occurrences of overlooked errors, and improves computational efficiency by identifying a broad range of errors that can be difficult or impossible to simulate manually.

The graphical user interface (GUI) provided by these systems and methods facilitates the configuration and execution of testing parameters corresponding to an application and can increase the speed and efficiency of application monitoring and testing (e.g., continuous governance, drift detection, Continuous Integration and Continuous Deployment (CI/CD), etc.). The GUI can provide a visual tool for users to dynamically configure and adapt testing parameters, and content items or actionable elements (e.g., interface elements, user inputs, images/icons, etc.) displayed via the GUI can be updated in real-time (or near real-time) based on the results of simulated application tests. As such, the GUI can provide updates that reflect application changes to developers, providing the developers with feedback on whether an application (or an update to an application, such as a patch) meets testing parameters or criteria (e.g., not causing an alarm) or fails to meet such parameters/criteria (e.g., triggers an alarm). This dynamic feedback loop facilitated by the GUI improves the responsiveness of development cycles and decreases operational latency by providing information to facilitate application updates.

Furthermore, the dynamic application testing system enhances the scalability and adaptability of software applications by incorporating testing models that integrate new testing scenarios and parameters in a secure digital environment. This can include automated API calls to retrieve and apply updated testing criteria, real-time monitoring and logging of application behavior, and the use of containerized environments to simulate various operating conditions without disrupting the application's live environment. The embodiments can further facilitate updates and modifications by deploying microservices that manage specific testing tasks (e.g., providing breach indications corresponding with triggered alarms), thereby reducing downtime and maintaining application performance. The testing or automated adaptation to new testing protocols can be facilitated through data ingestion and analysis pipelines, and the dynamic application testing system can incorporate emerging security threats, regulatory changes, and evolving standards into the application using data received through the pipeline. Thus, the disclosed systems and methods provide a secure and efficient development framework such applications can scale effectively while complying with standards or criteria.

Referring generally to the FIGS., disclosed are systems and methods for dynamic application testing. Some embodiments relate to providing an automated system to test and validate alarms or alerts of an application. The automated system can conduct tests for various alarms based on conditions known to trigger such alarms (e.g., breach data known to cause breaches). The automated system can validate if the alarm is triggered and determine if an alert exists on a third party system and an associated knowledge article (KB) is available. The automated system can further provide feedback (e.g., alert information, testing results, etc.) in various formats (e.g., email response, local file output, etc.).

In some embodiments, a user device can request and receive authentication information (e.g., NUID, ROPC, etc.) from a secrets manager of an application. The authentication information can correspond with a permission state of the user (e.g., DevOps IAM role). The user device can execute a script and provide the authentication information (e.g., NUID, ROPC, user email, etc.), permission state (e.g., DevOps role), and/or application information of the application (e.g., application code, asset ID, etc.) to an application testing environment for testing (e.g., modeling testing parameters). For example, the user device can provide the permission state (e.g., DevOps role) to an entity computing system, and the entity computing system can execute API calls to identify a list of alarms (also referred to as "alerts") corresponding with the application information and thresholds corresponding with each of the alarms (e.g., values causing one or more alarms to be triggered), and execute API calls to test various alarms using values known to trigger the alarms. In response to testing, the user device can provide the permission state to the secrets manager of the application, and the secrets manager can respond with the authentication information (e.g., NUID, ROPC ID, etc.). Further, the user device can transmit a token (e.g., including the NUID, ROPC ID, etc.) to a third party computing system, which can cause the third party computing system to make API calls to identify a list of the alarms triggered based on a time (e.g., a time of alarm activation) and/or asset identifier (e.g., corresponding to a specific alarm). The entity computing system and/or user device can compile the list of alarms with other alarm data into a report, and can further transmit the report (e.g., via email to the user).

In some embodiments, one or more processing circuits can receive an application package including an application and authentication information of a user. In some embodiments, the authentication information corresponds with one or more group permission states. In some embodiments, the one or more processing circuits can authenticate access to the application based on the authentication information of the user and the one or more group permission states. In some embodiments, the one or more processing circuits can model one or more testing parameters to generate one or more indications. In some embodiments, at least one indication of the one or more indications corresponds with at least one simulated breach. In some embodiments, modeling can further include one or more processing circuits retrieving, using an application programming interface (API) to call an API, the testing parameters of the application. In some embodiments, modeling can further include the one or more processing circuits simulating the at least one simulated breach by providing breach data to cause a state of at least one testing parameter of the testing parameters to be updated from a first state to a second state. In some embodiments, modeling can further include the one or more processing circuits generating at least one indication corresponding to the update from the first state to the second state. In some embodiments, the one or more processing circuits can generate and provide a token including the authentication information of the user and the indication to a monitoring system. In some embodiments, the one or more processing circuits can receive an alert identifier corresponding with the at least one indication. In some embodiments, the one or more processing circuits can generate a data package including the at least one testing parameter, the alert identifier, and the at least one indication.

Referring to FIG. 1, a block diagram depicting an example of a simulation system 110 in a computing environment 100 is shown, according to some embodiments. As shown, the computing environment 100 includes a database 120, a network 130, one or more user devices 140, an application 150, one or more third party computing systems 160, and one or more data sources 170. The simulation system 110 can include an authentication system 112, a modeling system 114, an identification system 116, and a generation system 118. The database 120 can include an authentication dataset 122 and a simulation dataset 124. The simulation system 110 can be communicatively coupled, via the network 130, to the database 120, the user device 140, the application 150, the third party computing system 160, and the data sources 170. Although the various computing elements of FIG. 1 can be described in the singular form (e.g., network 130, user device 140, etc.), it should be understood that the computing environment 100 can include two or more of any device/system described herein (e.g., two or more network(s) 130, two or more user device(s) 140, etc.).

Generally, the simulation system 110, user device 140, and third party computing systems 160 can include one or more logic devices, which can be one or more computing devices equipped with one or more processing circuits that run instructions stored in a memory device to perform various operations. The processing circuit can be made up of various components such as a microprocessor, an ASIC, or an FPGA, and the memory device can be any type of storage or transmission device capable of providing program instructions. The instructions may include code from various programming languages commonly used in the industry, such as high-level programming languages, web development languages, and systems programming languages. The simulation 110, user device 140, and third party computing system 160 may also include one or more databases for storing data, such as database 120, that receive and provide data to other systems and devices on the network 130.

Each system or device in environment 100 may include one or more processors, memories, network interfaces (sometimes referred to herein as a "network circuit") and user interfaces. The memory may store programming logic that, when executed by the processor controls the operation of the corresponding computing system or device. The memory may also store data in databases. For example, memory may store programming logic that when executed by a processor within a processing circuit, causes database 120 to update parameters or store a system or event log. The network interfaces may allow the computing systems and devices to communicate wirelessly or otherwise. The various components of devices in environment 100 may be implemented via hardware (e.g., circuitry), software (e.g., executable code), or any combination thereof. Devices, systems, and components in FIG. 1 can be added, deleted, integrated, separated, and/or rearranged in various embodiments of the disclosure.

As will be discussed in greater detail below, the simulation system 110 may be configured to protect access to data of data sources 170. That is, data sources 170 may be various types of storage platforms, including data lakes, databases, and other data repositories, to which the simulation system 110 may execute the functions to control and monitor access to the data sources 170. The simulation system 110 can interact with the various systems of environment 100 over network 130. In some embodiments, simulation system 110 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. Memory may include, but is not limited to, electronic, optical, magnetic, or any other storage devices capable of providing processor(s) with program instructions. The instructions may include code from any suitable computer programming language. In some embodiments, the simulation system 110 can include an interface circuit and function circuit.

In some embodiments, components of the environment 100 communicate over network 130. Network 130 can include computer networks such as the Internet, local, wide, metro or other area networks, intranets, satellite networks, other computer networks such as voice or data mobile phone communication networks, combinations thereof, or any other type of electronic communications network. Network 130 can include or constitute a display network. In various implementations, network 130 facilitates secure communication between components of environment 100. As a non-limiting example, network 130 can implement transport layer security (TLS), secure sockets layer (SSL), hypertext transfer protocol secure (HTTPS), and/or any other secure communication protocol.

In some embodiments, network 130 can be composed of various network devices (nodes) communicatively linked to form one or more data communication paths between participating devices. The network 130 can facilitate communication between the various nodes, such as the simulation system 110, database 120, one or more user device(s) 140, and one or more third party computing system(s) 160, and data source(s) 170 (e.g., using an OSI layer-4 transport protocol such as the User Datagram Protocol (UDP), the Transmission Control Protocol (TCP), Stream Control Transmission Protocol (SCTP), etc.). Each networked device can include at least one network interface for receiving and/or transmitting data, typically as one or more data packets. An illustrative network 130 is the Internet (however, other networks can be used). Network 130 can be an autonomous system (AS), i.e., a network that is operated under a consistent unified routing policy (or at least appears to from outside the AS network) and is generally managed by a single administrative entity (e.g., a system operator, administrator, or administrative group).

In some embodiments, the simulation system 110 can include and/or be communicatively coupled to one or more databases (e.g., database 120). For example, database 120 can be structured as a data repository that is configured to store data, such as authentication data (e.g., for authenticating user access) or simulation data (e.g., for testing application parameters). The database 120 can be part of the simulation system 110, or a separate component that the simulation system 110 or the user device 140 can access via the network 130. The database 120 can also be distributed throughout environment 100. For example, the database 120 can include multiple databases associated with the simulation system 110, a client device (e.g., user device 140), or both. Database 120 can include one or more storage mediums. The storage mediums can include, but are not limited to, magnetic storage, optical storage, flash storage, and/or RAM. In some arrangements, the simulation system 110 can implement or facilitate various APIs to perform database functions (i.e., managing, synchronizing, or linking data stored in database 120). The APIs can be but are not limited to SQL, ODBC, JDBC, NOSQL and/or any other data storage and manipulation API.

In some embodiments, the database 120 can include data structures for storing information, such as authentication dataset 122 and simulation dataset 124. For example, the authentication dataset 122 can store information for authentication or user access (e.g., user ID/password, user email, etc.). That is, the authentication dataset 122 can include authentication information (e.g., NUID, ROPC ID) for authenticating user access to test an application (e.g., application 150), such as one or more group permission states (e.g., developer permissions, DevOps role, etc.), user or application identifiers (e.g., usernames, entity names, application names, etc.), and various additional data. In some examples, the simulation dataset can include data structures storing information for evaluating compliance of a software application with various testing parameters or other criteria (e.g., alarms/alerts, application modules or components, error/breach/fault logs, performance metrics, hardware configurations, etc.). For example, the authentication dataset can include application data of the application 150 (e.g., application ID, asset identifiers, software dependencies, environmental variables, etc.), alarm/alert data (performance metrics, reliability metrics, security standards, data integrity standards, interoperability requirements, maintainability requirements, usability standards, technology stack specifics, code quality metrics), and various additional data. Further, the simulation system 110 can receive and/or modify such data via interactions and/or communications (e.g., via network 130) with one or more of the database 120, authentication dataset 122, and/or simulation dataset 124.

As shown, the simulation system 110 may be configured to communicate with the database 120. In some embodiments, the database 120 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. The memory may include, but is not limited to, electronic, optical, magnetic, or any other storage devices capable of providing processor(s) with program instructions. The instructions may include code from any suitable computer programming language.dat In some embodiments, the data sources 170 can include and/or provide similar features and/or functionality as described above regarding the database 120, authentication dataset 122, and/or simulation dataset 124. For example, the database 120 and/or the data sources 170 can be structured to collect data from other devices on network 130 (e.g., user device 140) and relay the collected data to the simulation system 110. In an example, the database 120 and/or the data sources 170 can host or otherwise support a search or discovery engine for Internet-connected devices. Further, the search or discovery engine can provide data, via the network 130, to the simulation system 110. In some examples, the database 120 and/or the data sources 170 can provide data to the simulation system 110 (e.g., using various data sources and/or data feeds), including data associated with a user, an application, or testing of an application (e.g., alarms/alerts, testing parameters, usernames and identifiers, permissions states, application modules or components, user interaction data, error/breach/fault logs, performance metrics, hardware configurations, software dependencies, environmental variables, external API responses, compatibility matrices, system health indicators, compliance checklists, load balancing strategies, resource allocation data, latency measurements, throughput rates, concurrency levels, transaction logs, data schemas, protocol specifications, feature flags, version control histories, user feedback, bug/fault/breach reports, etc.). The data sources 170 can include various computing systems and/or data structures (e.g., databases, datasets, etc.). In some embodiments, the third party computing system 160 can include the same or similar features and/or functionality as described regarding data sources 170.

As shown, the simulation system 110 may be configured to communicate with the data sources 170. In some embodiments, the data sources 170 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. The memory may include, but is not limited to, electronic, optical, magnetic, or any other storage devices capable of providing processor(s) with program instructions. The instructions may include code from any suitable computer programming language.

In some embodiments, the user device 140 (sometimes, depending on the configuration of the user device, the user device can be referred to herein as an "electronic device," "mobile device," or "mobile electronic device") can be a computing device, personal computer (PC), desktop computer, laptop computer, smartphone, tablet, smart watch, smart sensor, or any other device configured to facilitate receiving, displaying, and interacting with content (e.g., applications, etc.) or data (e.g., user data, application data, authentication data, simulation data, etc.). User device 140 can also include an input/output circuit for communicating data over network 130. In on example, user device 140 can be an entity computing system or be linked to an entity computing system configured to execute tests on the application 150. For example, the user device 140 can include a script (e.g., Python script) and execute the script to provide authentication and/or simulation data for application testing to the simulation system 110. In some examples, the user device 140 can display a user interface (e.g., graphical user interface, GUI, etc.). For example, the user device 140 can receive and display user interface elements (e.g., content, actionable items/elements, etc.) and receive user interaction with the elements via the user device 140 (e.g., via mouse clicks or interaction with a touchscreen display). In some examples, the user device 140 can include and/or execute the application 150, and in other examples, the user device 140 can interact with or access the application 150 via the network 130 and/or cause the application 150 to perform various operations via the network 130.

In some examples, the user device 140 can provide various content, elements, and/or interfaces (e.g., from the generation system 118 of the simulation system 110) to a user. For example, the user device 140 can provide a report generated by the simulation system 110 to the user corresponding with results of testing the application 150. In some examples, the user device 140 can provide the report by arranging or providing various content and/or elements on a GUI in viewport of the user device 140 (e.g., viewport referring to a visible area of the graphical user interface through which users can view and interact with user interface content and/or elements). In some examples, the user device 140 can transmit the report using various electronic communications protocols (e.g., email, SMS, TCP/IP, etc.) to the user.

As shown, the simulation system 110 may be configured to communicate with the user device 140. In some embodiments, the user device 140 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. The memory may include, but is not limited to, electronic, optical, magnetic, or any other storage devices capable of providing processor(s) with program instructions.

The instructions may include code from any suitable computer programming language.

In some embodiments, the application 150 can include any software program, executable code, data package/application package, or other data/system configured to provide various functionality. For example, the application 150 can include a collection of software development tools contained in a package (e.g., software development kit (SDK), application programming interface (API), integrated development environment (IDE), debugger, etc.). For example, application 150 can include an application programming interface (API) or a debugger, or an SDK that includes an API, a debugger, an IDE, and so on. Further, application 150 can include one or more libraries having functions that interface with a particular system software (e.g., iOS, Android, Linux, etc.). In some examples, the application 150 can be provided and/or at least partly supported by an entity associated with the simulation system 110.

In some embodiments, the application 150 can be installed and configured to run on computers, laptops, desktops, smartphones, tablets, and various other computing devices. In an example, the application 150 can include a client-side application that interacts with server-side components over the network. Further, the application 150 can be implemented using various programming languages and frameworks, such as Swift or Objective-C for iOS, and Kotlin or Java for Android. In an example, the application 150 can be packaged and distributed through the internet or other data channels (e.g., app stores). In an example, the application 150 can include a presentation layer (UI/UX), a business logic layer, and a data layer. Further, the application 150 can utilize various device capabilities (e.g., cameras, GPS, accelerometers, and touchscreens), can operate in online or offline modes (e.g., utilizing local storage and caching mechanisms to facilitate functionality when network connectivity is limited), and can implement various secure communication protocols (e.g., encryption, multi-factor authentication (MFA), etc.) to protect user, application, or entity data. The application 150 can be any application associated with a user of the user device 140 or an entity of the simulation system 110, in addition to various additional/alternative software applications.

In some embodiments, the third-party computing system(s) 160 are associated with third parties relative to an entity or user associated with the simulation system 110 or the application 150. As such, the third parties can include systems or entities providing various services, such as external data analysis, monitoring, testing, or authentication services maintained by a third party. That is, the third party computing system 160 can include one or more computing systems of linked service providers. In one example, the simulation system 110 can call or cause the third party computing system 160 to execute calls (e.g., API calls) using a token provided by the simulation system 110 and/or user device 140. That is, the simulation system 110 and/or user device 140 can transmit a token causing the third party computing system 160 to authenticate the user's access to a service provided by the third party and further cause the third party computing system 160 to perform a call (e.g., API call) to identify data corresponding to the service. For example, the simulation system 110 can cause the third party computing system 160 to identify alarms/alerts and various additional information corresponding with outputs of testing the application 150 (e.g., results of simulating breaches).

As shown, the simulation system 110 may be configured to communicate with the third party computing systems 160. In some embodiments, the third party computing system 160 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, the processor(s) may be a multi-core processor or an array of processors. The memory may include, but is not limited to, electronic, optical, magnetic, or any other storage devices capable of providing processor(s) with program instructions. The instructions may include code from any suitable computer programming language.

Figure 5:
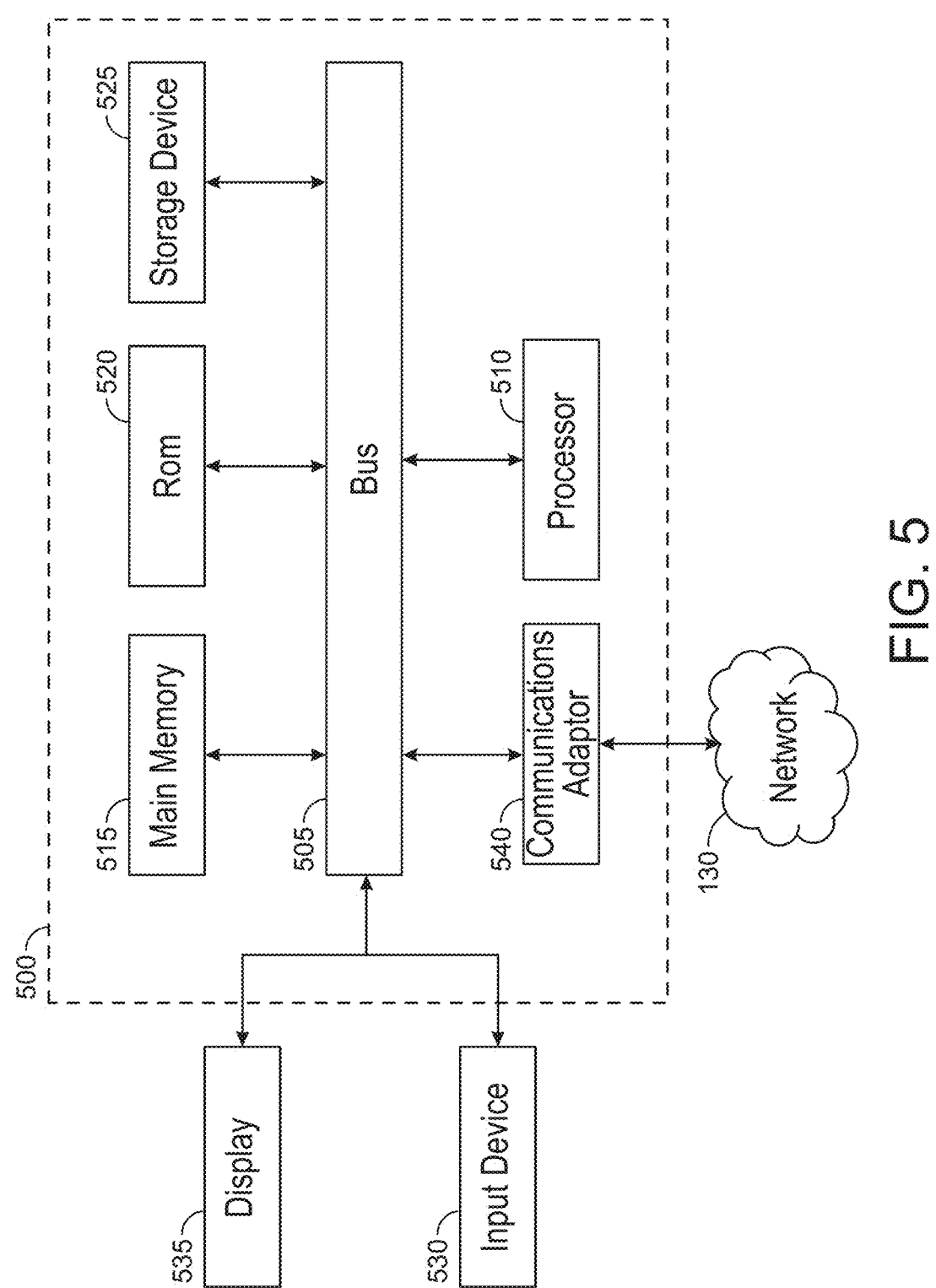
FIG. 5 is a block diagram illustrating an example computing system suitable for use in the various arrangements described herein, according to some embodiments.

In some embodiments, the computing device described in FIG. 5 can be used to run or otherwise implement the various functionalities and/or features described herein. In other embodiments, the simulation system 110 can be a server, distributed processing cluster, cloud processing system, or any other computing device or system. The simulation system 110 can include or execute at least one computer program or at least one script. The operations described herein can be implemented using software, hardware, or a combination thereof. For example, the simulation system 110 can include combinations of software and hardware, such as one or more processors configured to execute one or more scripts. For example, the simulation system 110 can include one or more processing circuits (e.g., a processing circuit) including a processor and memory (e.g., one or more non-transitory computer-readable media (CRM)), and the memory can have instructions stored thereon that, when executed by the processor, cause the processing circuit to perform the various operations described herein. As mentioned above and herein, the processor(s) included in the processing circuit(s) of the simulation system 110 can include a microprocessor, ASIC, FPGA, etc., or combinations thereof, or can include a multi-core processor or an array of processors. The memory (e.g., one or more non-transitory CRM) included in the processing circuit of the simulation system 110 can include, but is not limited to, electronic, optical, magnetic, or any other storage devices capable of providing a processor or processing circuit with program instructions. For example, the memory can include a floppy disk, CD-ROM, DVD, magnetic disk, memory chip, ROM, RAM, EEPROM, EPROM, flash memory, optical media, or any other suitable memory from which processor(s) can read instructions.

In some embodiments, the simulation system 110 can be configured to facilitate communication (e.g., via network 130) between the database 120, network 130, user devices 140, application 150, third party computing systems 160, data sources 170, and/or additional systems described herein (e.g., authentication system 112, simulation dataset 124, etc.). That is, the simulation system 110 and/or other components of FIG. 1 can communicate over the network 130 via a variety of architectures (e.g., client/server, peer-to-peer, etc.). In some examples, facilitation of communication can be implemented as an application programming interface (API) (e.g., REST API, Web API, and/or customized API, etc.), batch files, endpoint calls, and/or queries. For example, the simulation system 110 and/or other computing systems of FIG. 1 (e.g., third party computing systems 160) can use APIs to exchange data and make function calls in a structured format and/or based on API standards (e.g., of the simulation system 110, user device 140, and/or third party computing systems 160). For example, the simulation system 110 can perform API calls to receive application data or user data (e.g., alarm/alert lists, thresholds known to trigger alarms, user authentication information) and further test various application parameters of the application 150 (e.g., by providing breach data known to trigger alarms/alerts of the application based on the thresholds). In some examples, the simulation system 110 can include an API configured to specify an appropriate communication protocol using a suitable electronic data interchange (EDI) standard or technology. In one example, the various components of FIG. 1 (e.g., simulation system 110, third party computing systems 160, etc.) can exchange data using web services. In examples where data is exchanged using an API configured to exchange web service messages, some or all components of the computing environment can include or can be associated with (e.g., as a client computing device) one or more web service node(s).

Figure 2:
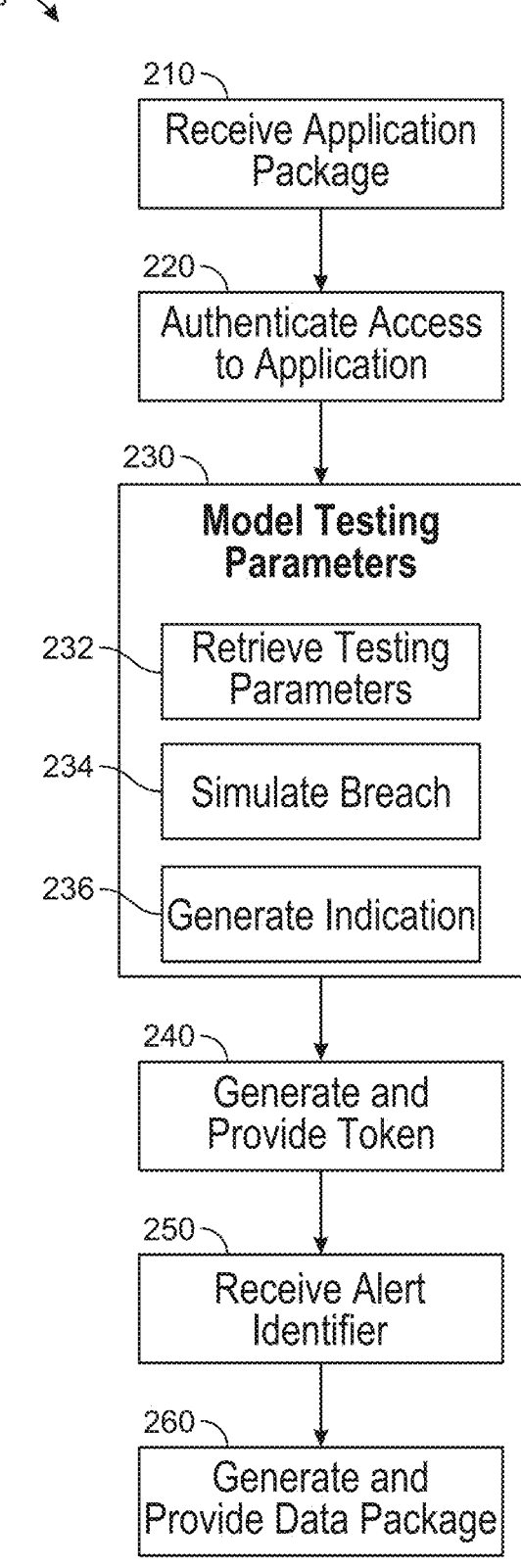
FIG. 2 is a flowchart for a computer-implemented method for dynamic application testing, according to some embodiments.

In some embodiments, the simulation system 110 can execute, perform, be utilized to execute/perform, and/or implement various methods, processes, features, and/or functionalities described herein (e.g., for performing one or more steps of method 200 of FIG. 2). For example, the simulation system 110 can be structured or configured to receive an application package including an application (e.g., application 150) and authentication information of a user (e.g., received via user input on user device 140, from database 120, etc.). In some embodiments, the simulation system 110 can receive authentication information corresponding with one or more group permission states (e.g., permission for the user to edit or test the application 150). In some embodiments, the simulation system 110 can authenticate access to the application 150 based on the authentication information of the user and the one or more group permission states. In some embodiments, the simulation system 110 can model one or more testing parameters (e.g., criteria corresponding to an alert/alarm) to generate one or more indications (e.g., indications of alerts/alarms or corresponding state changes). In some embodiments, the simulation system 110 can generate at least one indication of the one or more indications corresponding with at least one simulated breach (e.g., providing of simulated data to cause triggering of an alarm/alert).

In some embodiments, modeling can further include the simulation system 110 retrieving, using an application programming interface (API) to call an API, the testing parameters of the application. In some embodiments, modeling can further include the simulation system 110 simulating the at least one simulated breach by providing breach data (e.g., data known to trigger alarms/alerts based on thresholds corresponding to the alarm, test data known to cause failure/error, etc.) to cause a state of at least one testing parameter of the testing parameters to be updated from a first state (e.g., OFF, deactivated, etc.) to a second state (e.g., ON, activated, etc.). In some embodiments, modeling can further include the simulation system 110 generating at least one indication corresponding to the update from the first state to the second state (e.g., updated from untested or passed to failed test). In some embodiments, the simulation system 110 can generate and provide a token (e.g., JSON web token or JWT token) including the authentication information of the user and the indication to a monitoring system (e.g., third party computing system 160). In some embodiments, the simulation system 110 can receive an alert identifier (e.g., alarm ID, asset name, etc.) corresponding with the at least one indication (e.g., of a failed test). In some embodiments, the simulation system 110 can generate a data package including the at least one testing parameter (e.g., test case), the alert identifier (e.g., name or ID corresponding to the test case), and the at least one indication (e.g., of the test case being passed or failed).

In some embodiments, the simulation system 110 can further include one or more systems or sub-systems (e.g., authentication system 112, modeling system 114, identification system 116, generation system 118, etc.) for application testing and/or for incorporating the various features and/or functionalities described herein (e.g., for performing one or more steps of method 200 of FIG. 2). For example, the authentication system 112 of the simulation system 110 can be structured or configured to receive an application package (e.g., data structure) including an application (e.g., application 150) and authentication information of a user (e.g., NUID, ROPC ID, other user or entity credentials, etc.). In some embodiments, the authentication system 112 can receive authentication information corresponding with one or more group permission states (e.g., DevOps IAM role of the user with an entity, etc.). In some embodiments, the authentication system 112 can authenticate access to the application 150 based on the authentication information of the user and the one or more group permission states. For example, the authentication system 112 can validate the authentication information using various techniques, including password-based authentication, multi-factor authentication (MFA), token-based authentication, biometric authentication, certificate-based authentication, device-based authentication, single sign-on (SSO), and public key infrastructure (PKI).

In some embodiments, the modeling system 114 of the simulation system 110 can model one or more testing parameters (e.g., test cases) to generate one or more indications (e.g., indications of alerts/alarms or corresponding state changes). For example, the modeling system 114 can model the testing parameters by simulating breaches in a controlled testing environment (e.g., an environment configured to test features, functionality, and/or performance of the application 150 without affecting external systems or data). In some embodiments, the modeling system 114 can generate at least one indication corresponding with at least one simulated breach (e.g., test causing the application 150 to trigger an alarm). In some embodiments, modeling can further include the modeling system 114 retrieving, using an application programming interface (API) to call an API, the testing parameters of the application. For example, the modeling system 114 can execute an API call to receive alarm/alert data (e.g., via the API response) and further perform additional API calls including the received alarm/alert data (e.g., thresholds corresponding with the alarms/alerts) to test various testing parameters corresponding with the application 150.

In some embodiments, modeling can further include the modeling system 114 simulating the at least one simulated breach by providing breach data (e.g., test data known to cause failure/error, etc.) to cause a state of at least one testing parameter of the testing parameters to be updated from a first state (e.g., passed) to a second state (e.g., failed). For example, the modeling system 114 can execute an API call (e.g., PUT) to a cloud-based service to trigger alarms of the application 150 by sending relevant test data and parameters via the API call. In some embodiments, modeling can further include the modeling system 114 generating at least one indication corresponding to the update from the first state to the second state (e.g., updated from untested or passed to failed test). For example, the modeling system 114 can generate or create an alert notification (e.g., message, alarm, etc.) or log entry indicating the transition or update of a testing parameter from a passed state to a failed state.

In some embodiments, the identification system 116 of the simulation system 110 can generate and provide a token (e.g., JWT token) including the authentication information of the user and the indication to a monitoring system (e.g., third party computing system 160). For example, the identification system 116 can create a JWT token that includes encoded information, which can include data such as the user's credentials (e.g., NUID, ROPC ID), the specific test results, application information, a timestamp, etc. In another example, the identification system 116 can transmit the token via an API call to the monitoring system. In some embodiments, the identification system 116 can receive an alert identifier (e.g., alarm ID, asset name, etc.) corresponding with the at least one indication (e.g., of a failed test). For example, the identification system 116 can cause the monitoring service (e.g., third party computing system 160) to process the JWT token and identify or determine alert identifiers corresponding to triggered alarms from testing of the application 150, and the identification system 116 can receive such identifiers from the third party computing system 160 via an API response.

In some embodiments, the generation system 118 of the simulation system 110 can generate a data package including the at least one testing parameter (e.g., parameter corresponding to alert/alarm), the alert identifier (e.g., of the alert/alarm), and the at least one indication (e.g., notification of the application 150 failing or passing). For example, the generation system 118 can create a report or email summarizing the test parameters, alert identifiers, and test results and provide the report to the user device 140 for the user to view. In another example, the generation system 118 can create a log or report that includes performance evaluations, compliance audits, and relevant test data for further analysis and review, which can be transmitted (e.g., to the user over the network 130) and/or stored (e.g., in database 120, simulation dataset 124, data sources 170, etc.).

As shown, the dynamic application testing of FIG. 1 provides technical improvements over traditional static testing or simulation approaches. That is, the simulation system 110 provides improvements to flexibility, scalability, and compliance adaptability of application testing by efficiently and accurately simulating multiple breaches and further identifying and compiling various corresponding alarms/alerts automatically. Accordingly, the technical problem of static and inflexible application testing is solved by the technical solution of dynamic, automatic, adaptable, and scalable application testing.

Referring now to FIG. 2 flow diagrams for a method 200 of dynamic application testing is shown, according to some embodiments. One or more of the components of the computing environment 100 described with respect to FIG. 1 can be used to perform the steps of method 200. For example, the simulation system 110 can perform one or more of the steps of the method 200. Additional, fewer, or different operations can be performed depending on the particular arrangement. In some embodiments, some, or all operations of method 200 can be performed by one or more processors executing on one or more computing devices, systems, or servers. In some embodiments, each operation can be re-ordered, added, removed, or repeated.

In a broad overview of method 200, at block 210, the one or more processing circuits (e.g., simulation system 110 of FIG. 1) can receive an application package. At block 220, the one or more processing circuits can authenticate access to the application. At block 230, the one or more processing circuits can model testing parameters. At block 232, the one or more processing circuits can retrieve testing parameters. At block 234, the one or more processing circuits can simulate a simulated breach. At block 236, the one or more processing circuits can generate an indication. At block 240, the one or more processing circuits can generate and provide a token. At block 250, the one or more processing circuits can receive an alert identifier. At block 260, the one or more processing circuits can generate a data package.

In some embodiments, at block 210, the one or more processing circuits can receive an application package. In some embodiments, at block 210, the one or more processing circuits can receive an application package including an application and authentication information of a user. For example, the simulation system 110 or user device 140 can receive data via the network 130 (e.g., from database 120, application 150, etc.) including the application 150 and information for accessing or interacting with the application 150. That is, the simulation system 110 can receive the application data package including the application code, configuration files, and dependencies for the application 150 to function. In another example, the simulation system 110 or user device 140 can receive authentication data (e.g., ROPC ID, NUID, other user/entity identifiers, etc.) stored in a data store (e.g., database 120 of simulation system 110, an external database used as a secrets manager for the application 150, an internal secrets manager of application 150) by executing an API call and receiving an API response. In some examples, the simulation system 110 or user device 140 can receive or collect user authentication data by polling the data store at regular intervals or by listening for data change events that trigger data retrieval processes. For example, the simulation system 110 can receive the application data package including configuration settings, software dependencies, and specific versions of libraries corresponding to the application 150. That is, the application data package provides all components to recreate the runtime environment of the application 150 for testing and simulation. In another example, the application data package can include metadata describing operational parameters and performance benchmarks of the application 150 to be used during testing.

In some embodiments, the authentication information of the user can correspond with one or more group permission states. For example, the group permission states can include roles such as developer, tester, or other DevOps/IAM roles, each providing specific access levels and capabilities with respect to the application 150. In another example, the group permission states can define access to certain features or modules of the application 150, controlling what each user or group can test or modify. In another example, the group permission states can be used by the simulation system 110 to enforce security policies and compliance requirements (e.g., validating that users have the appropriate permissions to access sensitive portions of the application 150). In one example, the simulation system 110 or user device 140 can retrieve configuration settings specific to users and environment variables that customize the behavior of the application 150 for individual users or groups during the testing phase based on the group permission state(s).

In some embodiments, at block 220, the one or more processing circuits can authenticate access to the application. In some embodiments, at block 220, the one or more processing circuits can authenticate access to the application based on the authentication information of the user and the one or more group permission states. For example, the simulation system 110 can authenticate the user by verifying the NUID and ROPC ID against the data stored in database 120. In another example, the authentication system 112 can perform multi-factor authentication by sending a verification code to the email or mobile device of the user and requiring the user to enter this code along with their password. In another example, the authentication system 112 can use biometric data (e.g., fingerprint or facial recognition) stored in the secrets manager of the application 150 to authenticate the user. In another example, the simulation system 110 can authenticate access by checking the DevOps role or other group permission states of the user to validate that the user has the appropriate access level for interacting with specific features or modules of the application 150. In another example, the authentication system 112 can validate a token (e.g., JWT) received from the user device 140, which contains the authentication information and group permission states of the user, by decoding the token and verifying its integrity and authenticity. In another example, the authentication system 112 can query an external identity provider or directory service to confirm the identity and permission levels of the user before providing access to the application 150. In another example, the simulation system 110 can validate the authentication information of the user against a security policy database to comply with organizational security policies before providing access to the application 150.

In some embodiments, at block 230, the one or more processing circuits can model testing parameters. In some embodiments, at block 230, the one or more processing circuits can model multiple testing parameters to generate one or more indications. For example, the testing parameters can include performance metrics (e.g., response time, throughput), security policies (e.g., access control rules, encryption standards), error thresholds (e.g., maximum acceptable error rate), and user interaction scenarios (e.g., login procedures, data input methods) corresponding to the application 150. In one example, the indications can be alerts/arms, logs, or reports generated in response the application 150 failing or passing one or more of the testing parameters (e.g., notifications of errors, alarm activations, etc.). In some embodiments, at least one indication of the one or more indications corresponds with at least one simulated breach in the application. For example, the simulation system 110 can generate an indication as an alert when a testing parameter (e.g., performance metric, security policy, etc.) is violated or failed during testing of the application 150. In another example, the simulation system 110 can generate an indication as a log entry when an error threshold of a testing parameter of the application 150 is exceeded. In another example, the simulation system 110 can generate an indication as part of a report including performance issues observed during a simulated breach (e.g. high-load scenario). In some embodiments, modeling at block 230 can include the processing circuits performing the steps described with respect to one or more of block 232, block 234, and block 236 below.

In some embodiments, at block 232, the one or more processing circuits can retrieve testing parameters. In some embodiments, at block 232, the one or more processing circuits can retrieve, using at least one application programming interface (API) call to an API, the testing parameters of the application. For example, the simulation system 110 can execute an API call to a cloud-based monitoring service to obtain a list of alarms associated with the application 150. This API call can retrieve detailed information about each alarm, including the conditions or thresholds that trigger the alarms (e.g., CPU usage exceeding a certain percentage, memory leaks, or unauthorized access attempts). In another example, the simulation system 110 can call an API of a configuration management service to obtain the current configuration settings and performance metrics of the application 150. The retrieved data can include metrics such as response times, throughput rates, and error rates, and the simulation system 110 can use these metrics to determine the performance of the application 150 under various conditions. In another example, the simulation system 110 can use an API call to a security management service to obtain the security policies, compliance requirements, and access control rules applicable to the application 150. In another example, the simulation system 110 can execute multiple API calls to gather testing parameters, historical performance data, user interaction scenarios, software dependencies, and environmental variables.

In some embodiments, at block 234, the one or more processing circuits can simulate a simulated breach. In some embodiments, the one or more processing circuits can simulate the at least one simulated breach by providing breach data to the application to cause a state of at least one testing parameter of the testing parameters to be updated from a first state to a second state. For example, using the data retrieved in block 232, the simulation system 110 can execute multiple API calls to inject specific breach data into the application 150 that corresponds to the known alarm thresholds. The simulation system 110 can execute API calls to a cloud-based service or testing environment configured to test the application 150 while isolating application outputs (e.g., preventing failed test cases from being exposed to application users/customers). The simulation system 110 can receive API responses containing performance metrics, security policies, and error thresholds and then send requests to the application 150 to test these parameters. For instance, the simulation system 110 can send large volumes of requests to test load handling or inject malformed data to test security responses. The breach data from the API calls executed by the simulation system 110 can trigger one or more of the alerts/alarms identified in block 232.

In some embodiments, the state of at least one testing parameter can be updated from a first state (e.g., deactivated, OFF) to a second state (e.g., activated, ON) when an alarm is triggered. That is, the first state can correspond to the application 150 passing a test case and the second state can correspond to the application 150 failing a test case. For example, a performance metric testing parameter can transition from a first state of "inactive" to a second state of "active" when the system exceeds its load capacity. Similarly, a security testing parameter can transition from a first state of "secure" to a second state of "breached" when an injection attack is detected. A connectivity testing parameter can change from a first state of "connected" to a second state of "disconnected" when a network failure is simulated. Simulating a simulated breach can also include the simulation system 110 simulating or testing additional scenarios, such as sending a large number of simultaneous requests to simulate high-load conditions or throttling network connections to simulate network failures.

In some embodiments, at block 236, the one or more processing circuits can generate an indication. In some embodiments, at block 236, the one or more processing circuits can generate an indication corresponding to the update from the first state to the second state. For example, the simulation system 110 can generate an alert notification when a performance metric testing parameter transitions from the first state to the second state. In another example, the simulation system 110 can generate a log entry when a security testing parameter changes from secure to breached.

In another example, the simulation system 110 can create a report detailing the transition of a connectivity testing parameter from connected to disconnected. The indication can also include asset identifiers or other metadata to specify which component of the application 150 triggered the alert. In some embodiments, the indication can be a combination of different types of notifications, such as emails, dashboard updates, or automated messages sent to relevant stakeholders to inform them about the test results and any triggered alarms.

In some embodiments, at block 240, the one or more processing circuits can generate and provide a token. In some embodiments, at block 240, the one or more processing circuits can generate and provide a token including authentication information of the user and the indication to a monitoring system. For example, the simulation system 110 can create a JSON Web Token (JWT) that includes the user's authentication information (e.g., NUID, ROPC ID) and the indication of the alarm or alert triggered during testing. The simulation system 110 can securely transmit this token to a third-party monitoring system to log the test results and the corresponding user information, and the monitoring system (e.g., third party computing system 160) can use information included in the token to provide a user with access to application information, to maintain an accurate record of test outcomes and user activities, and more. The monitoring system can use the token to correlate the test results with specific user sessions and generate detailed reports based on this data. In some embodiments, the one or more processing circuits can generate and provide the token including a verification of the authentication information to provide access to the application. For example, the simulation system 110 can create a JWT that includes the user's authentication details and a verification status indicating successful authentication. This token can be transmitted to the third-party monitoring system, where it is validated to grant the user access. The token can also include metadata such as the user's role and permissions, and the monitoring system can use the metadata to control access to specific features and functionalities based on the user's credentials. The simulation system 110 can send this token through a secure channel and cause the third-party monitoring system (e.g., third party computing system 160) to validate the token to authorize the user to perform tasks or access certain features, such as alarm identifiers of triggered alarms (e.g., asset IDs) and/or corresponding information (e.g., timestamps, breaching data used to trigger the alarm, etc.).

In some embodiments, at block 250, the one or more processing circuits can receive an alert identifier. In some embodiments, at block 250, the one or more processing circuits can receive an alert identifier corresponding with the at least one indication. For example, the simulation system 110 can make API calls to a monitoring system to retrieve the specific alert identifier associated with the indication generated in block 236. This alert identifier can correspond to an asset ID, alarm ID, or other unique identifier that specifies the particular alert or alarm triggered during the testing process. In another example, the simulation system 110 can cause the monitoring system to make API calls to its internal services to identify and retrieve the specific alert identifier. In another example, the simulation system 110 can receive the alert identifier as part of the API response from the monitoring system, which provides a unique reference for the triggered alert. In another example, the alert identifier received can include metadata such as the time of the alert, severity level, and the specific condition that triggered the alert, which can be used by the simulation system 110 to facilitate tracking and analysis of the testing outcomes (e.g., via inclusion in a report or data package). For example, the alert identifier can correspond to a specific alarm triggered via the API calls, and the simulation system 110 can receive data corresponding to the alarm and further process the received data to extract the alarm identifier.

In some embodiments, at block 260, the one or more processing circuits can generate a data package. In some embodiments, at block 260, the one or more processing circuits can generate a data package including the at least one testing parameter, the alert identifier, and the at least one indication. For example, the simulation system 110 can compile the testing parameters, alert identifiers, and indications into a report. The simulation system 110 can format this report as a data package and email it to the user for review. In another example, the simulation system 110 can save the data package as a local file on the user device 140 or a designated storage location within the system (e.g., database 120) for later analysis. Additionally, the simulation system 110 can provide the data package to a graphical user interface (GUI) to display the results, showing the testing parameters, triggered alerts, and corresponding indications. For example, the user device 140 can present the data package via a GUI including charts, graphs, and other visual elements to present the test results. The generated report can be used to track performance, identify issues, and validate that the application 150 meets technical standards. In another example, the simulation system 110 can integrate the data package with a project management tool to update the status of testing tasks and assign follow-up actions to team members. In another example, the simulation system 110 can archive the data package in a version control system to maintain a historical record of testing results and changes over time. In another example, the simulation system 110 can send the data package to the user via various communication channels such as a messaging application, a collaboration platform, or a secure file transfer protocol (SFTP) site. In another example, the simulation system 110 can store the data package in a distributed ledger system to maintain data integrity and provide an immutable record of the testing results. Additionally, the simulation system 110 can integrate the data package with cloud storage services to facilitate access and/or sharing among team members or developers.

In some embodiments, simulating the at least one simulated breach can further include identifying, by the one or more processing circuits, at least one threshold value corresponding to the at least one testing parameter. For example, the simulation system 110 can identify threshold values that cause alarms to trigger by making API calls to retrieve these thresholds from the application 150. In another example, the simulation system 110 can determine threshold values based on other application data, such as configuration files or historical performance data, to identify the specific conditions that trigger alarms. These threshold values can include metrics such as maximum CPU usage, memory consumption limits, or response time thresholds, facilitating analysis and testing of various components of the application 150.

In some embodiments, simulating the at least one simulated breach can further include generating, by the one or more processing circuits, breach data including one or more data objects. For example, the simulation system 110 can generate breach data including multiple data objects (e.g., data points, data structures, etc.) used in API calls configured to trigger the alarms. This data can include specific inputs or scenarios known to exceed the identified threshold values, such as large volumes of requests to test load handling or malformed data to test security responses. Additionally, the simulation system 110 can create breach data sequences that mimic attack patterns or stress conditions to thoroughly test robustness and/or response mechanisms of the application 150. In some embodiments, at least one of the data objects is generated based on the threshold value that causes the state of the at least one testing parameter to be updated from the first state to the second state. For example, the simulation system 110 can generate a data object configured to exceed the CPU usage threshold, updating the performance metric testing parameter from a first state to a second state. In another example, the simulation system 110 can create data objects to trigger multiple alarms by simulating known breach scenarios, such as repeated failed login attempts or network latency issues, validating that the application 150 correctly identifies and responds to these conditions. The simulation system 110 can generate API calls with data configured to exceed thresholds and trigger alarms to facilitate thorough testing of multiple alarm mechanisms corresponding with the application 150.

In some embodiments, providing breach data to the application further includes initializing, by the one or more processing circuits, an application testing framework of the application based on the testing parameters. In some embodiments, the application testing framework includes a controlled virtual environment to isolate application outputs corresponding to the at least one breach. For example, the simulation system 110 can set up a virtual testing environment that mirrors the production environment of the application 150. This controlled environment can capture and analyze outputs without affecting the actual production data. In another example, the simulation system 110 can use containerization technologies to create isolated instances of the application 150 to prevent test data from interfering with live data. In some embodiments, providing breach data to the application further includes injecting the data objects into the application based on providing at least one data object of the data objects as input to an application testing framework of the application. For example, the simulation system 110 can use API calls to inject breach data into the application 150 within the controlled virtual environment. In some embodiments, injecting causes an invocation of at least one function of the application corresponding with the at least one testing parameter. For example, an API call can trigger specific functions in the application 150 that handle user authentication, data processing, or network communication to test these functions under simulated breach conditions. The simulation system 110 can monitor the response of the application 150 to these injected data objects to evaluate performance and security.

In some embodiments, providing breach data to the application further includes determining, by the one or more processing circuits, that the at least one indication includes a failure of the at least one testing parameter. For example, the simulation system 110 can analyze the responses and outputs of the application 150 in the controlled virtual environment to determine if any testing parameters have failed. This determination can be based on predefined criteria such as performance degradation, security breaches, or incorrect processing of data. In another example, the simulation system 110 can generate reports or alerts based on the failure of testing parameters to provide insights into the weaknesses and areas for improvement of the application 150.

In some embodiments, the authentication information includes a user identifier of the user and a password. For example, the authentication information can include an ROPC ID, NUID, or other unique identifiers such as an email address or a username specific to the environment of the application 150. In another example, the user identifier can be a combination of the first and last name of the user, employee ID, or a custom identifier used within the organization. The password can be a standard alphanumeric password, a passphrase, or a PIN code, depending on the security requirements of the application 150. Additionally, the authentication information can include other factors such as security questions or secondary email addresses for enhanced verification.

In some embodiments, the method 200 further includes transmitting, by the one or more processing circuits, a request including a user identifier of the user and the password responsive to the user interacting with a user device. For example, the user device 140 can prompt the user to enter login credentials, including the user identifier and password, via a secure login interface. The user device 140 can display a login form where the user inputs an ROPC ID or NUID and password, which is then transmitted to the authentication system 112 for validation. The authentication system 112 can process the credentials of the user and/or verify the credentials against stored data to confirm correctness and/or accuracy. The user device 140 can also employ various other techniques such as biometric authentication methods (e.g., fingerprint or facial recognition) or multifactor authentication (MFA), where the user provides a secondary verification code sent to a mobile device or email. The simulation system 110 can receive this authentication request and process it to validate the credentials of the user before granting access to the application 150. The simulation system 110 can transmit the authentication request securely by encrypting the data using SSL/TLS protocols (e.g., HTTPS, secure WebSockets) to prevent interception or unauthorized access during the validation process. Additionally, the simulation system 110 can implement logging and monitoring mechanisms (e.g., activity logs, audit trails, intrusion detection systems) to track authentication attempts and detect unauthorized activities.

In some embodiments, authenticating can further include, in response to receiving at least one successful response from the request, storing, by the one or more processing circuits, the user identifier and the password corresponding with the one or more group permission states. For example, the simulation system 110 can store the user identifier and password in a secure database or secrets manager of the application 150, associating them with specific group permissions such as developer, tester, or DevOps roles. In another example, the simulation system 110 can update an internal user profile with the authentication information and group permissions to streamline future access and authorization processes. Additionally, the simulation system 110 can encrypt the stored authentication information to enhance security. In some embodiments, authenticating can further include transmitting, by the one or more processing circuits, a request for application data of the application. For example, the simulation system 110 can send an API call to the application 150 to request application data such as configuration settings, performance metrics, and active user sessions. In another example, the simulation system 110 can query a configuration management database (CMDB) to retrieve the application data, including software versions, dependencies, and deployment statuses.

In some embodiments, the application data includes a position identifier, an application code of the application, an asset identifier of an asset of the application, and a storage location of the user or an access location of the user. For example, the position identifier can represent the role or function of the user within the system, such as a DevOps engineer or a quality assurance tester. The application code can uniquely identify the application 150 being tested, including version numbers and release notes. The asset identifier can correspond to specific components or modules of the application 150, such as database instances, microservices, or network interfaces. The storage location of the user can refer to the designated location within the system where user data and preferences are stored, while the access location can denote the physical or logical location from which the user accesses the application 150. In some embodiments, the method 200 further includes transmitting, by the one or more processing circuits, the data package including a report of the at least one testing parameter and the at least one indication to the user based on the storage location or the access location. For example, the simulation system 110 can email the report to the user's registered email address (access location) or upload it to a secure server directory (storage location) accessible by the user. In another example, the simulation system 110 can provide the report through a user portal or dashboard for the user to view and/or download the report from a central location. The report can include insights or additional data corresponding to the testing parameters, triggered alarms, and overall performance metrics of the application 150, and the simulation system 110 can provide this information to the user device 140 for display to the user.

In some embodiments, the first state is a deactivated state corresponding with the at least one testing parameter passing, and in some embodiments, the second state is an activated state corresponding with the at least one testing parameter failing. For example, the first state can indicate that specific performance metrics, such as response time, CPU usage, or memory consumption, are within acceptable limits for a particular test case, and no alarms are triggered. The second state can indicate that one or more of these metrics exceed the defined thresholds for the same test case, triggering alarms to signify performance issues. The state can be updated based on the application 150 exceeding threshold values obtained from the threshold data or other application parameters for that specific test case. In some embodiments, the at least one indication corresponds with the first state based on detecting an output of the application passing the testing parameter, or corresponds with the second state based on detecting the output of the application failing the testing parameter. For example, the simulation system 110 can generate an indication, such as an alert, alarm, or log entry, corresponding to the first state when it detects that a specific test case or testing parameter of the application 150 returns expected outputs for predefined input conditions, passing the test. The simulation system 110 can generate an indication corresponding to the second state when it detects anomalies such as prolonged response times, excessive resource usage, or unauthorized access attempts in a specific test case or testing parameter, indicating that the application 150 has failed the test. In another example, the simulation system 110 can monitor log files, error messages, and system events to determine whether the outputs of a specific test case or testing parameter of the application 150 meet variation application standards and generate corresponding indications for passed or failed states.

In some embodiments, the method 200 further includes generating, by the one or more processing circuits, one or more content items or actionable elements corresponding to the data package. For example, the content items can include elements such as charts, graphs, status indicators, or informational text displayed within the graphical user interface (GUI) of the user device 140. These elements can visually represent the results of the testing parameters and provide an overview of the performance and security status of the application 150. The actionable elements can include interactive components such as buttons, dropdown menus, input fields, or sliders that users use to configure settings or initiate actions based on the test results. In some embodiments, at least one first element of the one or more content items or actionable elements includes the at least one indication, and at least one second element of the one or more content items or actionable elements includes the alert identifier. For example, the first element can display the status of the alarm, such as an indicator that changes color from green to red when an alarm is triggered, or a text notification that specifies the nature of the triggered alarm. The second element can display the specific alert identifier, such as the unique identifier of the test case or testing parameter that was triggered. In some embodiments, the method 200 further includes providing, by the one or more processing circuits, the one or more content items or actionable elements to a graphical user interface (GUI) in a viewport. For example, the simulation system 110 can render the content items and actionable elements within the GUI of the user device 140. The GUI can present the status of the application 150, display the results of the testing parameters, and provide interactive elements for users to engage with specific test cases or metrics via the user device 140, as described in detail with regard to FIG. 4 herein.

In some embodiments, the at least one testing parameter includes one or more testing configurations to determine one or more performance metrics of the application. For example, the testing configurations can include scenarios configured to measure response times, CPU usage, memory consumption, and throughput of the application 150. These configurations can be set up within the simulation system 110 to test different aspects of the application's performance under various conditions, such as high user load, limited network bandwidth, or restricted system resources. In some embodiments, the method 200 further includes modeling, by the one or more processing circuits, at least one performance metric of the one or more performance metrics based on the at least one simulated breach to generate metric data indicating a performance of the application. For example, the simulation system 110 can model at least one performance metric by transmitting data to simulate a high-load condition by generating a large number of simultaneous requests to the application 150 and measuring the resulting response times and system resource usage. In another example, the simulation system 110 can simulate a security breach by injecting malformed data into the application 150 and observing the application's ability to handle and recover from the attack. In another example, the simulation system 110 can model performance metrics by providing breach data via API calls and analyzing application responses, as done with regard to modeling testing parameters. In some examples, The simulation system 110 can receive data indicative of performance metrics obtained from these simulations including data points such as average response time, peak CPU usage, memory leaks, and error rates.

In some embodiments, the method 200 further includes embedding, by the one or more processing circuits, the metric data into the data package. For example, the simulation system 110 can compile the performance metrics into a structured format, such as a JSON or XML file, and embed this file into the data package. The embedded metric data can include charts and graphs illustrating the performance of the application 150 under different test scenarios. In one example, the simulation system 110 can embed the metric data in the report related to testing of the application 150 provided to the user (e.g., via email, storage in a database, etc.) with the testing data (e.g., alarm data/identifiers corresponding to application 150).

Figure 3:
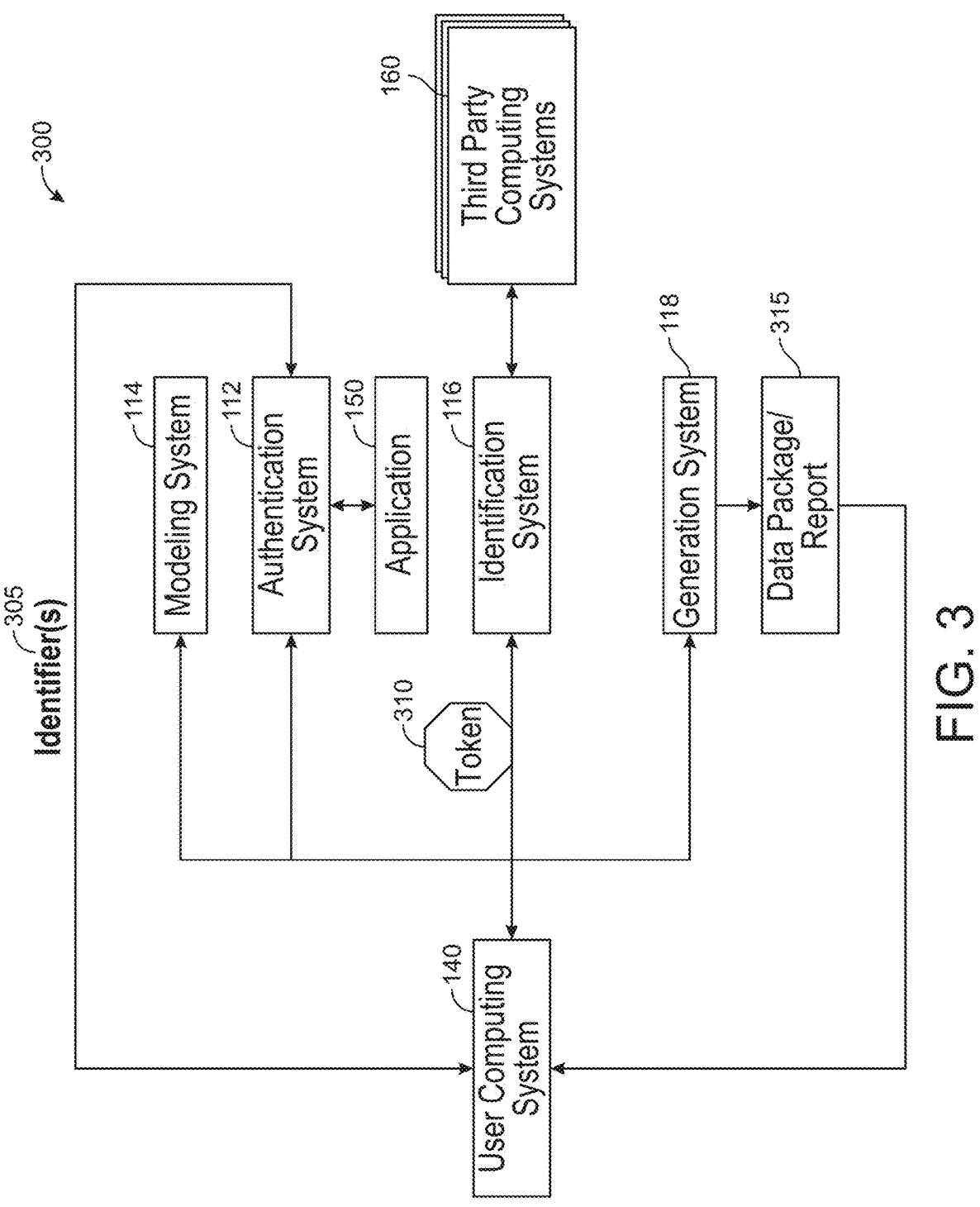
FIG. 3 is a block diagram depicting an implementation of a system for dynamic application testing, according to some embodiments.

Referring now to FIG. 3, a block diagram depicting an implementation of a system 300 for dynamic application testing is shown, according to some embodiments. In some embodiments, the user device 140 can request and receive identifiers 305 (e.g., authentication information including NUID, ROPC, etc.) from a secrets manager (e.g., authentication system 112) of the application 150. The authentication information can correspond with a permission state of the user, such as a developer and/or operations role configured to provide the user with access to test the application 150. The user device 140 can execute a script and provide the authentication information (e.g., NUID, ROPC, user email, etc.), permission state (e.g., DevOps IAM role), and/or application information of the application (e.g., application code, asset ID, etc.) to a cloud-based testing service. For example, the user device can provide the permission state (e.g., IAM role) to the modeling system 114, and the modeling system 114 can execute API calls to identify a list of alarms (also referred to as "alerts") corresponding with the application 150, and thresholds corresponding with each of the alarms (e.g., values causing one or more alarms to be triggered).

In some embodiments, the modeling system 114 can further execute API calls to test various alarms using values known to trigger one or more alarms of the application 150. In response to testing, the user device 140 can provide the permission state to the authentication system 112, which can provide the authentication information (e.g., NUID, ROPC ID, etc.) in response. Further, the user device 140 can transmit a token 310 (e.g., JWT token) to the identification system 116, which can transmit the token 310 to a third party computing system 160 and can cause the third party computing system 160 to make API calls to identify one or more activated alarms/alerts based on a time (e.g., a time of alarm activation) and/or asset identifier (e.g., corresponding to a specific alarm). The identification system 116 can receive this alarm data from the third party computing system 160 and further provide the alarm data to the generation system 118, which can compile the list of alarms with other alarm data into a data package/report 315. The generation system 118 can further transmit the data package/report 315 (e.g., via email) to the user for viewing on the user device 140 and/or store the report (e.g., in an internal database).

Referring now to FIG. 4, an example graphical user interface (GUI) 400 depicting an application testing report is shown, according to some embodiments. In general, the user interface 400 (or "graphical user interface 400," "GUI 400," etc.) facilitates the display of validation status information for alarms and alerts, including the results of the testing parameters and any corresponding indications. That is, the GUI 400 can display the generated report by presenting the data package, testing parameters, alert identifiers, and indications to the user for review and analysis. In some embodiments, the graphical user interface 400 is provided via a client or user application provided and supported by a mobile computing device (i.e., as a downloaded application configured to execute or run on the client or user device 140). In other embodiments, the graphical user interface 400 is provided (e.g., by user device 140, simulation system 110 of FIG. 1) as a hosted website and is accessible by the user device via a network (e.g., network 130 of FIG. 1).

In some embodiments, the graphical user interface 400 can include a variety of user interface elements, including content (e.g., content items) or actionable elements (e.g., interactive elements). For example, the content can include information such as the results of the alarm testing, validation status data, and other relevant data related to the application testing process. In another example, the interactive elements can include buttons, drop-down menus, pop-up windows, and other user input items corresponding to an application and related alarms/alerts. The interactive elements (e.g., actionable element, input field, content item, etc.) can receive an input via the user device 140 and be updated (or cause other elements or content of the GUI 400 to be updated) as the user interacts with the interactive or actionable element. In some embodiments, the graphical user interface 400 displays application testing results (e.g., a data package, report, etc.) in a tabular format, showing the specific testing parameters, triggered alerts, and corresponding indications. In various arrangements, various pages (e.g., validation status pages, alarm information pages, etc.) can be displayed by graphical user interface 400 and can include individual interfaces such as a first application testing interface, a second application testing interface, a third application testing interface, and so on. The user can interact with the various content items and/or actionable elements to perform various functions and/or to access or view various pages (e.g., test results page, alarm data page, etc.) displayed by the GUI 400. That is, the GUI 400 can present the data package, including the at least one testing parameter, the alert identifier, and the at least one indication, within a viewport to the user to view test results or initialize follow-up actions related to testing of the application 150.

In some embodiments, as shown in FIG. 4, the GUI 400 can include one or more testing parameters 410a-410n (collectively, testing parameters 410) and corresponding information from results of testing the application 150. For example, the GUI 400 can include resource identifiers 420, alarm names 430, alarm states 440, breach data 450, alarm indications 460, and/or a monitoring service alarm identifiers 470. In one example, the GUI 400 can include information for each of the testing parameters 410 of the application 150 corresponding to the resource identifiers 420, alarm names 430, alarm states 440, breach data 450, alarm indications 460, and/or a monitoring service alarm identifiers 470. For example, the testing parameter 410b can include a resource identifier 420b of "Resource #1", an alarm name 430b including an alphanumeric string used to identify an alarm corresponding to the application by the user or an associated entity, an alarm state 440b of "alarm updated from OK to ALARM," breach data 450b including one or more data points used to trigger the alarm (e.g., provided via API calls used for testing) and corresponding timestamps of alarm activation, an alarm indication 460b of "Yes" corresponding to a positive indication of an alarm being created, and monitoring service alarm identifier 470b be including an alphanumeric string used to identify the alarm by the monitoring service (e.g., third party computing system 160 and/or associated third party entity).

In some embodiments, the GUI 400 facilitates interaction with and visualization of the various test data and/or outputs of testing the application 150, including providing alarm testing parameters 410, alert identifiers 470, indications 460, and various additional application data or testing data to the user device 140 for the user to view. For example, the GUI 400 can display the data package including the at least one testing parameter 410b, the monitoring service alarm identifier 470b, and the indication 460b in a viewport of the user device 140. The GUI 400 can include multiple testing parameters 410 and corresponding resource identifiers 420, alarm names 430, alarm states 440, breach data 450, alarm indications 460, and/or a monitoring service alarm identifiers 470 in a tabular format, as shown on FIG. 4. In some example, the GUI 400 can include additional interactive elements, such as buttons or drop-down menus, and the GUI 400 can filter or sort the displayed data based on criteria such as the type of test, severity of the alert, or time of occurrence responsive to user input via the interaction elements. Additionally, the GUI 400 can provide views or statuses corresponding with each alarm, including the breach data 450 and timestamps, to facilitate further review and analysis of the application 150 (e.g., to be used in additional testing, etc.).

In some embodiments, the at least one testing parameter 410*b* includes the monitoring service alert identifier 470*b* and the indication 460*b*, and the monitoring service alert identifier 470*b* is displayed as a unique ID (e.g., associated with the user and the monitoring service/third party computing system 160) linked to the triggered alarm such that the simulation system 110 can trace back to the specific conditions that caused the specific alert/alarm. In some examples, the GUI 400 can present the indication 460*b* using various formats, including as a status indicator (e.g., as a color-coded alert that signifies whether the application 150 passed or failed the testing parameter 410*b*). For example, the indication 460*b* can be a red indicator to represent the first state (e.g., where no alert is triggered), and can transition to displaying as a green indicator to represent the second state (e.g., where an alert is activated). In some examples, the simulation system 110 or a user of the user device 140 can process or use the information included on the GUI 400 (e.g., alarm states 440, indications 460, etc.) to identify issues associated with the application 150 and/or initiate corresponding follow-up actions (e.g., via user input within GUI 400), and for various additional and/or alternative tasks corresponding with providing a dynamic application testing FIG. 5 illustrates a depiction of a computer system 500 that can be used, for example, to implement an illustrative simulation system 110, an illustrative database 120, an illustrative user device 140, an illustrative application 150, an illustrative third party computing system 160, an illustrative data source 170, and/or various other illustrative systems described in the present disclosure. The computing system 500 includes a bus 505 or other communication component for communicating information and a processor 510 coupled to the bus 505 for processing information. The computing system 500 also includes main memory 515, such as a random-access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 can further include a read only memory (ROM) 520 or other static storage device coupled to the bus 505 for storing static information and instructions for the processor 510. A storage device 525, such as a solid-state device, magnetic disk or optical disk, is coupled to the bus 505 for persistently storing information and instructions.

The computing system 500 can be coupled via the bus 505 to a display 535, such as a liquid crystal display, or active matrix display, for displaying information to a user. An input device 530, such as a keyboard including alphanumeric and other keys, can be coupled to the bus 505 for communicating information, and command selections to the processor 510.

In some embodiments, the input device 530 has a touch screen display 535. The input device 530 can include a cursor control, such as a mouse, a trackball, or cursor direction keys, for communicating direction information and command selections to the processor 510 and for controlling cursor movement on the display 535.

In some embodiments, the computing system 500 can include a communications adapter 540, such as a networking adapter. Communications adapter 540 can be coupled to bus 505 and can facilitate communications with a computing or communications network 130 and/or other computing systems. In some embodiments, any type of networking configuration can be achieved using communications adapter 540, such as wired (e.g., via Ethernet), wireless (e.g., via Wi-Fi, Bluetooth, etc.), pre-configured, ad-hoc, LAN, WAN, etc.

In some embodiments, the processes that effectuate illustrative implementations that are described herein can be achieved by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement can also be employed to execute the instructions contained in main memory 515. In some embodiments, hard-wired circuitry can be used in place of or in combination with software instructions to implement illustrative implementations. Thus, implementations are not limited to any specific combination of hardware circuitry and software.

Although an example processing system has been described in FIG. 5, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks, distributed ledger networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementations or of what may be claimed, but rather as descriptions of features specific to particular implementations of particular implementations. Certain features that are described in this specification in the context of separate implementations can also be carried out in combination or in a single implementation. Conversely, various features that are described in the context of a single implementation can also be carried out in multiple implementations, separately, or in any suitable subcombination.

Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks, distributed ledger networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementations or of what may be claimed, but rather as descriptions of features specific to particular implementations of particular implementations. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for providing and validating alerts, the method comprising:

receiving, by one or more processing circuits, an application package comprising an application and authentication information of a user, wherein the authentication information corresponds with one or more group permission states;

authenticating, by the one or more processing circuits, access to the application based on the authentication information of the user and the one or more group permission states;

modeling, by the one or more processing circuits, a plurality of testing parameters to generate one or more indications, wherein at least one indication of the one or more indications corresponds with at least one simulated breach in the application, and wherein modeling comprises:

retrieving, by the one or more processing circuits using at least one application programming interface (API) call to an API, the plurality of testing parameters of the application;

simulating, by the one or more processing circuits, the at least one simulated breach by providing breach data to the application to cause a state of at least one testing parameter of the plurality of testing parameters to be updated from a first state to a second state; and generating, by the one or more processing circuits, the at least one indication corresponding to the update from the first state to the second state;

generating and providing, by the one or more processing circuits, a token comprising the authentication information of the user and the indication to a monitoring system, wherein the token further comprises a verification of the authentication information to provide the access to the application;

receiving, by the one or more processing circuits and from the monitoring system, an alert identifier corresponding with the at least one indication; and generating, by the one or more processing circuits, a data package comprising the at least one testing parameter, the alert identifier, and the at least one indication.

2. The method of claim 1, wherein simulating the at least one simulated breach further comprises:

identifying, by the one or more processing circuits, at least one threshold value corresponding to the at least one testing parameter; and generating, by the one or more processing circuits, the breach data comprising a plurality of data objects, wherein at least one of the plurality of data objects is generated based on the threshold value that causes the state of the at least one testing parameter to be updated from the first state to the second state.

3. The method of claim 2, wherein providing breach data to the application further comprises:

initializing, by the one or more processing circuits, an application testing framework of the application based on the plurality of testing parameters, wherein the application testing framework comprises a controlled virtual environment to isolate application outputs corresponding to the at least one breach;

injecting, by the one or more processing circuits, the plurality of data objects into the application based on providing at least one data object of the plurality of data objects as input to an application testing framework of the application, and wherein injecting causes an invocation of at least one function of the application corresponding with the at least one testing parameter; and determining, by the one or more processing circuits, the at least one indication comprises a failure of the at least one testing parameter.

4. The method of claim 1, wherein the authentication information comprises a user identifier of the user and a password, and wherein the method further comprises:

transmitting, by the one or more processing circuits, a request comprising a user identifier of the user and the password responsive to the user interacting with a user device.

5. The method of claim 4, wherein authenticating further comprises:

in response to receiving at least one successful response from the request, storing, by the one or more processing circuits, the user identifier and the password corresponding with the one or more group permission states; and transmitting, by the one or more processing circuits, a request for application data of the application.

6. The method of claim 5, wherein the application data comprises a position identifier, an application code of the application, an asset identifier of an asset of the application, and a storage location of the user or an access location of the user, and the method further comprises:

transmitting, by the one or more processing circuits, the data package comprising a report of the at least one testing parameter and the at least one indication to the user based on the storage location or the access location.

7. The method of claim 1, wherein the first state is a deactivated state corresponding with the at least one testing parameter passing, wherein the second state is an activated state corresponding with the at least one testing parameter failing, and wherein the at least one indication corresponds with the first state based on detecting an output of the application passing the at least one testing parameter, or corresponds with the second state based on detecting the output of the application failing the at least one testing parameter.

8. The method of claim 1, further comprising:

generating, by the one or more processing circuits, one or more content items or actionable elements corresponding to the data package, wherein at least one first element of the one or more content items or actionable elements comprises the at least one indication, and wherein at least one second element of the one or more content items or actionable elements comprises the alert identifier; and providing, by the one or more processing circuits, the one or more content items or actionable elements to a graphical user interface (GUI) in a viewport.

9. The method of claim 1, wherein the at least one testing parameter comprises one or more testing configurations to determine one or more performance metrics of the application, and the method further comprises:

modeling, by the one or more processing circuits, at least one performance metric of the one or more performance metrics based on the at least one simulated breach to generate metric data indicating a performance of the application; and embedding, by the one or more processing circuits, the metric data into the data package.

10. A system for providing and validating alerts, the system comprising:

one or more processing circuits configured to:

receive an application package comprising an application and authentication information of a user, wherein the authentication information corresponds with one or more group permission states;

authenticate access to the application based on the authentication information of the user and the one or more group permission states;

model a plurality of testing parameters to generate one or more indications, wherein at least one indication of the one or more indications corresponds with at least one simulated breach in the application, the one or more processing circuits further configured to:

retrieve, using at least one application programming interface (API) call to an API, the plurality of testing parameters of the application;

simulate the at least one simulated breach by providing breach data to the application to cause a state of at least one testing parameter of the plurality of testing parameters to be updated from a first state to a second state; and generate the at least one indication corresponding to the update from the first state to the second state;

generate and provide a token comprising the authentication information of the user and the indication to a monitoring system, wherein the token further comprises a verification of the authentication information to provide the access to the application;

receive, from the monitoring system, an alert identifier corresponding with the at least one indication; and generate a data package comprising the at least one testing parameter, the alert identifier, and the at least one indication.

11. The system of claim 10, the one or more processing circuits further configured to, in simulating the at least one simulated breach:

identify at least one threshold value corresponding to the at least one testing parameter; and generate the breach data comprising a plurality of data objects, wherein at least one of the plurality of data objects is generated based on the threshold value that causes the state of the at least one testing parameter to be updated from the first state to the second state.

12. The system of claim 11, the one or more processing circuits further configured to, in providing breach data to the application:

initialize an application testing framework of the application based on the plurality of testing parameters, wherein the application testing framework comprises a controlled virtual environment to isolate application outputs corresponding to the at least one breach;

inject the plurality of data objects into the application based on providing at least one data object of the plurality of data objects as input to an application testing framework of the application, and wherein injecting causes an invocation of at least one function of the application corresponding with the at least one testing parameter; and determine the at least one indication comprises a failure of the at least one testing parameter.

13. The system of claim 10, wherein the authentication information comprises a user identifier of the user and a password, and wherein the one or more processing circuits are further configured to:

transmit a request comprising a user identifier of the user and the password responsive to the user interacting with a user device.

14. The system of claim 13, the one or more processing circuits further configured to, in authenticating:

in response to receiving at least one successful response from the request, store the user identifier and the password corresponding with the one or more group permission states; and transmit a request for application data of the application.

15. The system of claim 14, wherein the application data comprises a position identifier, an application code of the application, an asset identifier of an asset of the application, and a storage location of the user or an access location of the user, and wherein the one or more processing circuits are further configured to:

transmit the data package comprising a report of the at least one testing parameter and the at least one indication to the user based on the storage location or the access location.

16. The system of claim 10, wherein the first state is a deactivated state corresponding with the at least one testing parameter passing, wherein the second state is an activated state corresponding with the at least one testing parameter failing, and wherein the at least one indication corresponds with the first state based on detecting an output of the application passing the at least one testing parameter, or corresponds with the second state based on detecting the output of the application failing the at least one testing parameter.

17. The system of claim 10, the one or more processing circuits further configured to:

generate one or more content items or actionable elements corresponding to the data package, wherein at least one first element of the one or more content items or actionable elements comprises the at least one indication, and wherein at least one second element of the one or more content items or actionable elements comprises the alert identifier; and provide the one or more content items or actionable elements to a graphical user interface (GUI) in a viewport.

18. The system of claim 10, wherein the at least one testing parameter comprises one or more testing configurations to determine one or more performance metrics of the application, and wherein the one or more processing circuits are further configured to:

model at least one performance metric of the one or more performance metrics based on the at least one simulated breach to generate metric data indicating a performance of the application; and embed the metric data into the data package.

19. One or more non-transitory computer-readable media (CRM) having instructions stored thereon that, when executed by one or more processing circuits, cause the one or more processing circuits to:

receive an application package comprising an application and authentication information of a user, wherein the authentication information corresponds with one or more group permission states;

authenticate access to the application based on the authentication information of the user and the one or more group permission states;

model a plurality of testing parameters to generate one or more indications, wherein at least one indication of the one or more indications corresponds with at least one simulated breach in the application, the one or more processing circuits further configured to:

retrieve, using at least one application programming interface (API) call to an API, the plurality of testing parameters of the application;

simulate the at least one simulated breach by providing breach data to the application to cause a state of at least one testing parameter of the plurality of testing parameters to be updated from a first state to a second state; and generate the at least one indication corresponding to the update from the first state to the second state;

generate and provide a token comprising the authentication information of the user and the indication to a monitoring system, wherein the token further comprises a verification of the authentication information to provide the access to the application;

receive, from the monitoring system, an alert identifier corresponding with the at least one indication; and generate a data package comprising the at least one testing parameter, the alert identifier, and the at least one indication.

20. The one or more non-transitory CRM of claim 19, further causing the one or more processing circuits to, in simulating the at least one simulated breach:

identify at least one threshold value corresponding to the at least one testing parameter; and generate the breach data comprising a plurality of data objects, wherein at least one of the plurality of data objects is generated based on the threshold value that causes the state of the at least one testing parameter to be updated from the first state to the second state.

* * * * *